UNITED STATES PATENT OFFICE 2,671,013

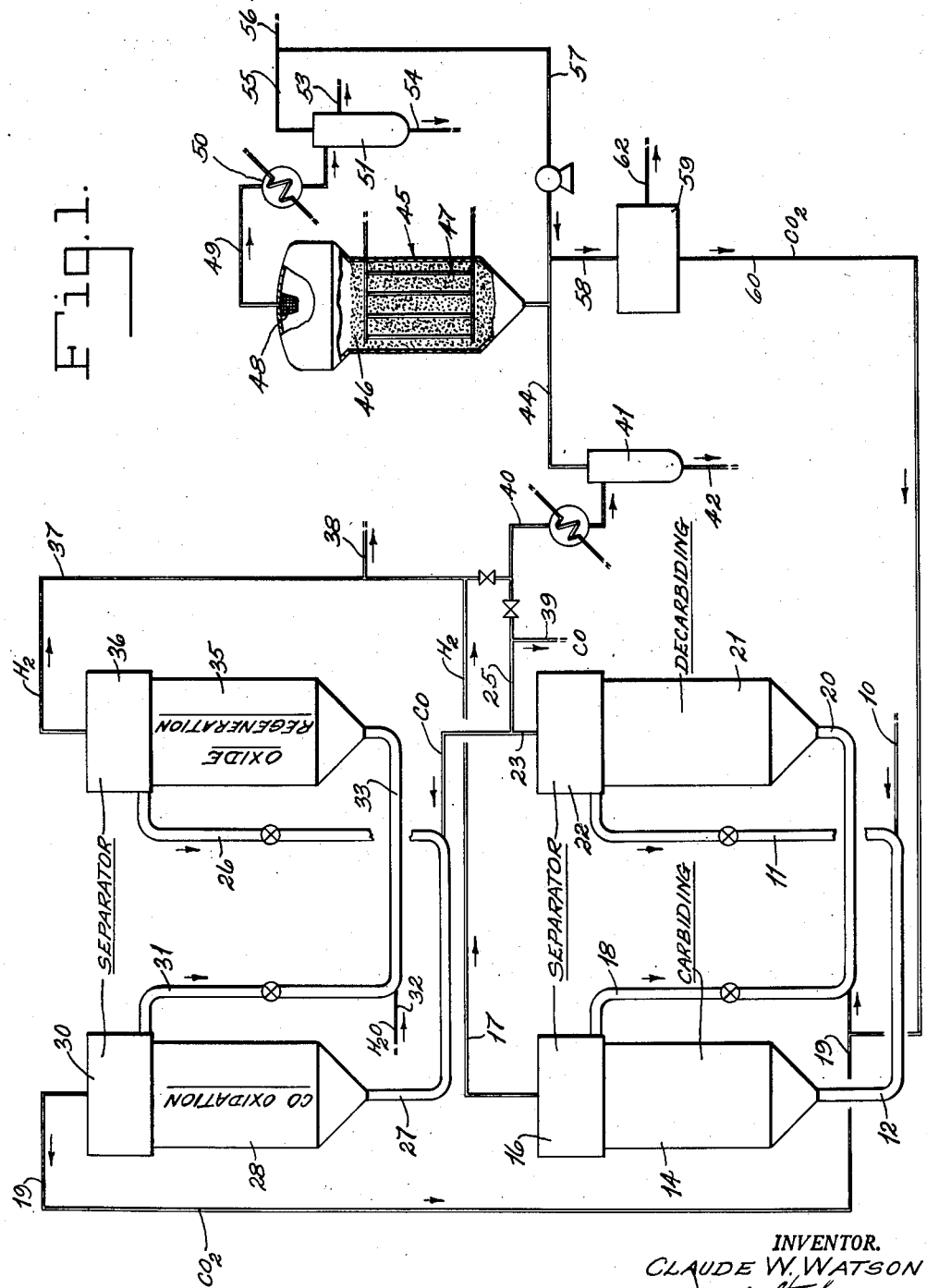

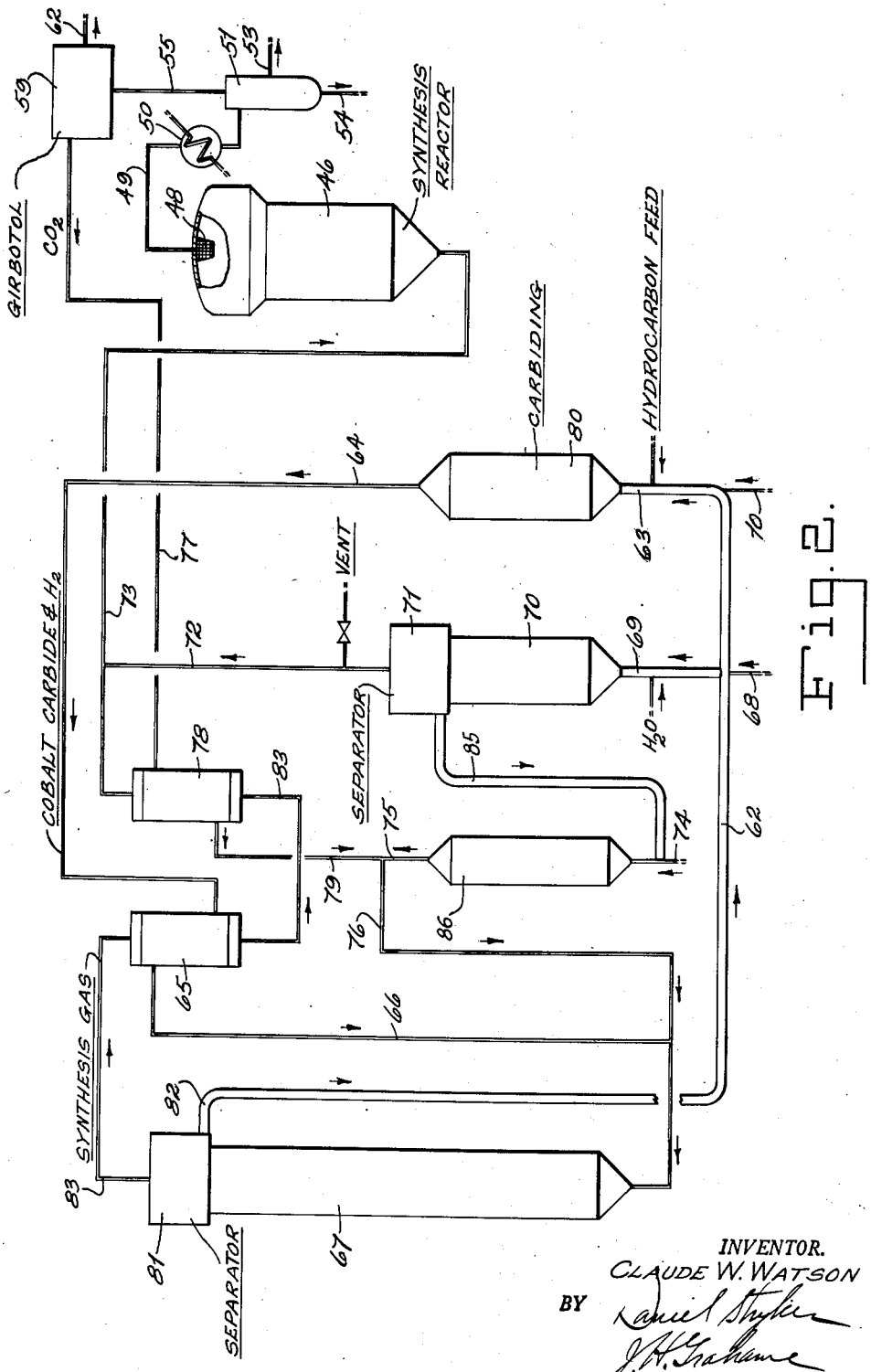

METHOD FOR PRODUCING A SYNTHESIS GAS

Claude W. Watson, Port Arthur, Tex., assignor to The Texas Company, New York, N. Y., a corporation of Delaware Application November 10, 1949, Serial No. 126,491

7 Claims. (Cl. 48—196)

The present invention relates generally to the catalytic synthesis of hydrocarbons, oxygenated hydrocarbons and mixtures thereof, and broadly is concerned with the preparation of a stream of synthesis gas comprising hydrogen and carbon oxide, particularly a mixture of hydrogen and carbon monoxide suitable as a reactant feed for catalytic conversion to said desired synthetic products.

In particular, the present invention contemplates the preparation of synthesis gas from a carbonaceous feed material containing hydrogen by reaction with a readily carbidable and subsequently decarbidable metal at the elevated temperature at which decomposition takes place to liberate free hydrogen and form a carbide of the metal. The term readily carbidable and subsequently decarbidable metal as used herein means manifestly a metal which readily combines with carbon to form a carbide, which in turn, is readily decarbidable.

The carbidable metal subjected to reaction with the carbonaceous feed is preferably formed by reduction of previously carbided metal particles at elevated temperatures, with carbon dioxide. The previously carbided and decarbided metal is highly reactive with the carbonaceous feed to effect the desired decomposition thereof and a high rate of decarbiding.

Reduction of the metal carbide by carbon dioxide to the relatively or substantially decarbided form simultaneously yields a substantial stream of carbon monoxide, quite materially in excess of the carbon dioxide supplied. The decarbided metal may be returned, preferably continuously, to effect decomposition of fresh carbonaceous feed material.

A particular feature of the present invention involves the continuous conversion of a portion of the product carbon monoxide thus formed into carbon dioxide by reaction, at an elevated temperature, with a stream of a readily reducible metal oxide. In this manner, a small portion of the carbon monoxide produced is continuously converted into sufficient carbon dioxide to effect the reduction of the metal carbide formed, yielding overall a substantial excess of carbon monoxide which may be withdrawn and intermixed with the product hydrogen to form a synthesis gas of the desired composition.

Operating in this manner, the metal oxide is advantageously regenerated and returned, preferably continuously, for oxidation of additional carbon monoxide. This regeneration is preferably effected by high temperature contact of the reduced metal oxide particles with high pressure steam or water vapor under conditions effective to return the metal to a high state of oxidation and yield incidentally an additional high stream of pure gaseous hydrogen.

The invention accordingly has the advantage of producing gaseous hydrogen and carbon monoxide in a mol ratio which is high as regards free hydrogen content. Actually, it will be apparent that even with continuous diversion of product carbon monoxide to form the carbon dioxide required for decarbiding the carbidable metal, the theoretical yield of hydrogen and carbon monoxide from the carbiding and decarbiding steps corresponds to the stoichiometric equivalent of the carbon and hydrogen in the original hydrocarbonaceous feed.

Moreover, the additional free hydrogen formed by the continuous regeneration or reoxidation of the metal oxide substantially supplements the synthesis gas yield and desirably raises the overall portion of free hydrogen in the case of carbonaceous feeds containing relatively low proportions of hydrogen.

On the other hand, with feed materials relatively high in hydrogen, such for example, as methane and other hydrocarbon gases, the excess of hydrogen may be advantageous in improving the yield of hydrocarbons, revivifying the catalyst and, in general, providing a valuable by-product credit.

The present invention has the further important effect of permitting wide flexibility of operation, since manifestly, the amount of product carbon monoxide which is diverted to form the stream of carbon dioxide for reduction of the iron carbide may be widely varied, dependent upon the availability of carbon dioxide from outside sources.

For example, the subsequent catalytic production of desired hydrocarbon fractions from the synthesis gas thus produced normally results in a substantial yield of by-product carbon dioxide, which in itself is variable over a wide range, depending upon the catalyst employed, reaction conditions and the like. This by-product carbon dioxide may be recovered and substituted for any portion of the carbon dioxide formed by the oxidation of the product carbon monoxide, thus, in effect, permitting wide variation in the amount of carbon monoxide withdrawn in the synthesis gas.

It is to be noted, moreover, that the production of gaseous hydrogen during regeneration of the readily reducible metal oxide, in general, varies with the quantity of product carbon monoxide being converted to carbon dioxide thereby. In short, as less carbon monoxide is converted into carbon dioxide by the metal oxide, steam regeneration correspondingly decreases. Therefore, as extraneous carbon dioxide is substituted, the production of hydrogen is lessened and the product ratio of hydrogen to carbon monoxide decreases.

In this way, the process lends itself particularly to the production of synthesis gas of any desired ratio of hydrogen to carbon monoxide from feed materials of varying atomic H/C ratio, and in addition, enables the production of relatively pure streams of either of these components.

The invention in its broadest sense enables production of high purity synthesis gas without the requirement for high purity rectified oxygen hitherto demanded out of practical necessity. In addition, it provides an essentially self-contained system inherently capable of high yields.

In accordance with one advantageous modification, decarbiding of the metal carbide and reduction of the readily reducible metal oxide may be effected simultaneously in a single zone where both reactions go forward cooperatively in the presence of each other to yield the metal in essentially elemental form, thus, in effect, obviating one processing step.

In order to enable comprehension of the invention in further detail, reference is made to the attached drawing wherein Figure I is a flow sheet illustrating one embodiment of the present invention in rather elemental form, and Figure II represents an alternative arrangement in which decarbiding of the metal carbide is effected simultaneously with reduction of the readily reducible metal oxide to effect mutual completion of the desired reactions.

In Figure I, an incoming stream of carbonaceous feed material, preferably in the form of a gas or vapor at 1000° F. or higher, passes from any suitable source not shown through inlet pipe 10 into duct 12 where it joins the lower portion of standpipe 11.

The carbonaceous feed is preferably a hydrocarbon, ranging anywhere from a gaseous fraction such as methane or natural gas to higher boiling fractions of the gas oil or residual fuel oil range. Provision, not shown, is best made by preheating the steam fed to pipe 10 to the level indicated and preferably as high as feasible without substantial cracking.

The preheated feed stream picks up, at the bottom of standpipe 11, finely divided solid particles of readily carbidable or decarbidable metal previously decarbided, as will hereinafter more fully appear, and carries them as a suspension through pipe 12 into the lower portion of carbiding reactor 14. The suspension of the particles in the reactant vapors passes upwardly at a slow rate and at a temperature substantially above 1000° F. and above 1300° F., during which the hydrocarbon is decomposed, to yield a gaseous effluent composed essentially of hydrogen, and to carbide the metal particles.

Manifestly, therefore, the amount of metal particles fed into the reactor 14 with the hydrocarbon feed stream should be sufficient to combine with all the carbon of the decomposed feed material as a metal carbide. Accordingly, it is preferred to supply a substantial excess over and above the stoichiometric quantities indicated by the amount of carbon in the carbonaceous feed. In this way, decomposition of the feed is carried close to completion at good reaction rates.

It is to be noted that the reactor 14, as well as the similarly symbolized reactor hereinafter described, are represented only diagrammatically, and therefore, should include provision, not shown, for maintaining the reactants at the elevated temperatures required to thermally support the reaction. For example, firing chambers, electrical heating elements or any other conventional equivalents may be provided for maintaining the interior of the reactors at the specified temperature levels.

Moreover, in place of an upwardly moving suspension of solid particles and vapors disclosed, a mass of the solid particles may be held in dense fluid phase condition by flowing the vapors upwardly therethrough, with continuous withdrawal of the product gas from the upper pseudo-liquid level thereof. In such case, introduction of the solid particles preferably takes place at the upper portion of the reaction zone with bottom draw-off to effect an essentially countercurrent contact. However, catalyst introduction and withdrawal may be reversed and, similarly, provision may be made for passing the catalyst through the reactor in either direction as an unfluidized moving bed.

In any event, the gasiform product effluent of reactor 14 passes into gas-solid separator 16 which removes any particles of metal carbide from the product stream of hydrogen, the latter passing overhead through pipe 17 while the separated particles of highly carbided metal discharge downwardly through said pipe 18.

The specific form of separator is manifestly, per se, immaterial to the present invention and may comprise a filter or any effective cyclonic, electrostatic, or any other conventional gas-solid separating means. In the embodiments where magnetic particles are involved, magnetic separators are obviously indicated.

Passing downwardly in the standpipe 18, the metal carbide is in turn picked up in a stream of carbon dioxide injected through pipe 19 and carried as a suspension through pipe 20 into the lower portion of decarbiding reactor 21.

In reactor 21 again at a temperature substantially above 1000° F. and preferably above 1300° F., the carbon dioxide reacts with the metal carbide to form carbon monoxide and return the carbided metal to its essentially elemental form. Accordingly, as above intimated, the metal particles are withdrawn after substantial decarbiding and before any appreciable or substantial portion of the metal has been converted to an oxide, which would impair the desired hydrocarbon decomposition.

Separation of the decarbided particles from the product gas takes place in separator 22, the residual stream of carbon monoxide passing overhead through pipe 23 while the separated particles discharge into standpipe 11, previously mentioned.

Therefore, in the system thus far described, the readily reducible carbidable and decarbidable metal particles continuously cycle between decarbiding zone where the reaction occurs with carbon dioxide to form carbon monoxide, and a carbiding zone 14 where they are carbided by contact with the fresh carbonaceous feed, producing free hydrogen, and a decarbiding zone 21, where they are decarbided by contact with carbon dioxide to form product carbon monoxide. In respect to this system, reference is had to my copending application, Serial No. 126,492, filed of even date herewith, wherein this method is described and claimed.

Of the carbon monoxide stream in line 23, a substantial proportion passes into branch pipe 25 and the remainder up to an amount corresponding with the mol quantity of carbon dioxide consumed in decarbiding reactor 21, passes as shown into pipe 27, where it picks up and entrains finely powdered, readily reducible metal oxide delivered through standpipe 26.

The suspension of metal oxide in the carbon monoxide stream passes into the bottom of a reactor 28 where reaction occurs at an elevated temperature above 1000° F., and preferably above 1500° F. with substantial reduction of the metal oxide and oxidation of the carbon monoxide into carbon dioxide. As before, separation of entrained solid particles from the product carbon dioxide takes place in a separator 35, the residual carbon dioxide being delivered overhead into pipe 19, previously mentioned, and the reduced metal oxide being discharged into standpipe 31.

Regeneration of the reduced metal oxide is effected by a stream of high temperature steam injected from any suitable source not shown through pipe 32, which entrains the particles at the bottom of standpipe 31 and transports them through line 33 into the bottom of reactor 35. Temperature in the reactor 35 may be maintained as low as about 400° F., when the readily oxidizable metal is in relatively finely powdered form. However, temperatures as high as 1000° F. and over are usually accompanied by a substantial increase in the rate of reaction and purity of the product stream.

As above mentioned, the products of reaction pass into a separator 36 from which hydrogen flows overhead through pipe 37 and the regenerated metal particles are discharged into standpipe 26, previously mentioned.

In operation, therefore, at least a portion of the carbon dioxide required for decarbiding of the carbon carrier particles in reactor 21 is formed by continuously reoxidizing a portion of the product carbon monoxide withdrawn from this reactor.

Since regeneration of the metal oxide by water vapor results in a substantial supplementary stream of hydrogen, vent pipe 38 is preferably provided for withdrawing any desired portion as a relatively pure stream. Vent pipe 39 in line 25 permits withdrawal of relatively pure carbon monoxide. However, the remaining hydrogen and carbon monoxide in lines 17 and 37 flow into line 25, where they mix in the desired ratio and advantageously pass through condenser 40 to decanter 41 for the separation of contained water vapor which is drawn off through tap 42.

The resulting dry synthesis gas passes through line 44 into the bottom of the synthesis reactor 45, which may take any conventional form, but preferably contains a fluidized mass of hydrocarbon synthesis catalyst 46, maintained at a regulated temperature by indirect exchanger 47.

The effluent gasiform products of reaction emerge from the upper surface of the catalyst into the disengagement space and pass through filter 48 into line 49 leading through condenser 50 into separator 51. Therein, the condensed oil layer separates and is withdrawn through pipe 53, the condensed water is discharged through pipe 54 and the residual tail gas passes overhead as at 55. After venting any desired portion of the tail gas as at 56, the remainder is recycled through branch line 57, partly to the synthesis reactor 46 and partly through branch pipe 58 to carbon dioxide separation plant 59. The gas plant 59 may employ the "Girbotol" system, using triethanolamine as an absorbent, but obviously, any other effective method of carbon dioxide separation is suitable.

The separated carbon dioxide is discharged as a relatively pure stream through line 60. As indicated, line 60 joins with carbon dioxide line 19, enabling relative adjustment of these two streams to control the ultimate relative yield of hydrogen and carbon monoxide. The residual product gas from gas plant 59 passes through pipe 62 for recycle to the inlet of the synthesis reactor, use as a fuel gas, or any other desired disposition.

In accordance with one example of actual operation, finely powdered iron is continuously subjected to alternate contact with methane and carbon dioxide. In each alternate step, contact is effected at a temperature of about 2000° F. and under a pressure of about 18 atmospheres with the gas passing through the fine powder with a contact time of about one minute.

During introduction of the methane stream, about 95.7 per cent hydrogen in the methane is converted into free gaseous form and withdrawn. This operation is terminated when conversion falls off materially, the powder remaining in the reaction zone at this time being predominantly iron carbide.

Thereafter, a stream of carbon dioxide is introduced under substantially the same reaction conditions as in the previous step. The product gas comprising over 99 per cent of carbon monoxide is likewise separated and withdrawn. When the conversion of carbon dioxide falls appreciably, introduction is terminated and the methane feed is again instituted, the cycle being continuously repeated.

One half of the product gas stream of carbon monoxide is conducted into a separate reactor and passed through a mass of finely powdered, highly oxidized iron particles at a temperature of 2000° F. and under 18 atmospheres pressure. After a contact time of about one minute, the gaseous product withdrawn from contact with the iron oxide is composed essentially of carbon dioxide which constitutes the previously mentioned stream of carbon dioxide passed into contact with the iron carbide powder.

The iron oxide is periodically regenerated by cutting off the supply of carbon monoxide when the conversion of carbon monoxide falls appreciably and injecting it at about 900° F. with high pressure steam until substantial reoxidation has occurred. The gaseous product withdrawn from contact with the metal powder after condensation and separation of the excess water vapor comprises essentially pure hydrogen.

During continuous cyclic operation in this manner, the particles of the respective powders assume a fine porous condition which appears to greatly facilitate the reactions, and as a result, reaction occurs much more rapidly than would be expected, yielding a high state of purity.

In the foregoing example, the mol ratio of the total hydrogen to carbon monoxide produced closely approximates 3:1. This, however, may be controlledly decreased, as above indicated, by effecting a part at least of the decarbiding with carbon dioxide drawn from any extraneous source.

Referring now to Figure II of the drawing, the incoming feed of hydrocarbon in pipe 10 mixes with a finely powdered metal supplied through a solids delivery duct, conveyor or header 62 and elevates it as a suspension through a pipe 63 into carbiding reactor 64 where reaction occurs as before, yielding a suspension of metal carbide in gaseous hydrogen which is withdrawn through pipe 64.

This suspension passes, as indicated, through a heat exchanger 65 which raises it to an even more elevated temperature above about 1500° F. for passage through line 66 into the bottom of decarbiding reactor 67.

Simultaneously, a portion of the metal powder in distributing header 62 is picked up by an injected stream of high temperature steam introduced through line 68 and the resulting suspension is carried upwardly through pipe 69 into oxide regeneration reactor 70 where the metal particles are converted to an oxide, meanwhile liberating hydrogen which passes through separator 71 into outlet line 72 leading into synthesis gas header 73.

The oxidized powder discharged by the separator 71 may, if desired, be advantageously subjected to even more intense oxidizing conditions to assure maximum conversion to metal oxide. To this end, the separated particles may pass downwardly through standpipe 85 to the lower portion of reactor 86, where they are picked up in a stream of pure molecular oxygen introduced through pipe 74 from any suitable source not shown. Manifestly, only a minor stream of pure oxygen is sufficient to assure complete oxidation at this point.

The resultant suspension of cobalt oxide particles in a stream of product carbon dioxide passes overhead through pipe 75 into carbon dioxide header 76, which merges with aforementioned pipe 66 leading into reactor 67. In addition to the foregoing reactants supplied to reactor 67, through header 76, there is preferably included a stream of carbon dioxide recovered and recycled from the tail gases of the hydrocarbon synthesis catalyst reaction, to be hereinafter described.

Line 77 receives this carbon dioxide stream and conveys it to exchanger 78 where it is raised to an elevated temperature and discharged through pipe 79 into the carbon dioxide header 76. It is to be thus noted that all of the various streams introduced into the reactor 67 are preferably at a high preheat such that maintenance of the desired temperature, substantially above 1000° F., as for example above 1300° F. and preferably above 2000° F., is facilitated in reactor 67 with minimum external heating.

In reactor 67, a number of reactions simultaneously ensue. Thus the cobalt carbide powder upon contact with the stream of carbon dioxide, is decarbided, liberating gaseous carbon monoxide. The carbon monoxide gas formed reacts immediately with the particles of cobalt oxide, reducing them likewise to the elemental form.

In effect, therefore, the gaseous reaction product of each reaction involving, respectively, cobalt oxide and cobalt carbide, furnishes a reactant effective to convert the other solid powder into the elemental metal. The ultimate result is in the nature of a release of combined oxygen and carbon by the two solid components to form product carbon monoxide, and return both the carbided and oxidized particles to the elemental metallic form. At the high temperatures contemplated, the reactions come to equilibrium with formation of a high temperature product gas consisting predominantly of carbon monoxide. The reaction is surprisingly rapid and yields product carbon monoxide of increasing purity as the temperature of the reaction is increased. Separation of this gas from the suspended cobalt particles is effected in separator 81 which discharges the particles down standpipe 82 into distribution header 62, previously mentioned, while the residual gas passes through line 83 into successive, previously mentioned exchangers 78 and 65, where it is cooled to about synthesis temperature.

As in the previous embodiment, the resulting synthesis gas stream, after any desired pretreatment or pre-heating not shown, passes through synthesis reactor 46 and the product goes to separation and recovery system as in the previous embodiment. The stream of carbon dioxide, separated in gas plant 59, supplies previously mentioned recycle line 77.

It is to be understood that, in the interest of clarity and simplicity, the foregoing flow sheets omit conventional cooling, circulating and other equipment obvious to one skilled in the art, in light of the present disclosure.

For the same reason, the flow sheets omit details of heating and cooling instrumentalities for maintaining appropriate reaction temperatures and heat balance, such as may be provided by any skilled engineer familiar with the foregoing. In general, it may be said that the carbiding and decarbiding reactions are generally endothermic in character, requiring external heat energy which may be furnished in any suitable way, as for example, by indirect exchange from an external or even an internal source. On the other hand, the steps of oxidizing and deoxidizing the readily oxidizable metal particles, as well as the catalytic synthesis of hydrocarbons, are exothermic in character and may require external cooling. Manifestly, therefore, the process lends itself to interexchange of thermal energy between the several reactors to the end that thermal efficiency may reach a satisfactory level.

The present invention has the advantage of operating at widely varying pressures, from atmospheric upwardly, as high as 600 p. s. i. g. and higher, although lower pressures in the range of from 100-300 p. s. i. g. are preferred.

While the previous embodiments have been described largely in terms of cobalt and iron as oxygen and carbon carriers, a number of alternate metals are obviously available. As above indicated, the metal carbide carrier may comprise any metal readily carbidable at elevated temperatures by the carbonaceous material, and thereafter readily reconvertible to the elemental metal by contact with carbon dioxide. Included in this class are, for example, iron, nickel, cobalt, chromium and many others. The oxygen carrier, on the other hand, may compose any metal readily oxidizable by steam to an oxide which releases oxygen at elevated temperatures in the presence of carbon monoxide to yield carbon dioxide. Examples of such metals are iron, nickel, cobalt, copper, tin, manganese, antimony, zinc, etc.

In a combination process as illustrated in Figure II, wherein the same metal is used as a carbide and oxygen carrier, the class is limited accordingly, to metals possessing, mutually, the foregoing carbiding and oxidizing properties.

It is to be understood that the reaction temperatures, while preferably at an elevated level, nevertheless will vary in accordance with the specific metal selected. In general, as indicated, temperatures above 1000° F. are in all cases necessary for carbiding and decarbiding, whereas somewhat lower temperatures are suitable for oxidation of the metal by steam.

The term "carbonaceous feed material containing hydrogen" contemplates, as above indicated, carbonaceous materials containing substantial proportions of hydrogen and therefore, includes the complete class of hydrocarbons extending from the preferred, normally gaseous hydrocarbons, such as methane, ethane and the like, through the normally liquid boiling hydrocarbons and residual fractions, such as gas oil and even tars, which, however, are, as above indicated, advantageously reacted at high temperatures in the form of a vapor.

In addition, this term contemplates feed materials which, while containing hydrogen and carbon, are not generally spoken of as hydrocarbons. Such, for example, are natural carbonaceous deposits such as coal, which may be fed to the reactor in the finely divided form, but preferably is supplied in liquid form or vapor form by pressure and temperature in a conventional manner.

Preferably, the carbonaceous feed comprises a sufficient proportion of hydrogen to yield substantial quantities in the product gas. Therefore, it is advantageous to employ carbonaceous feed materials containing at least, and preferably more than one atom of hydrogen for every two atoms of carbon. This enables the direct production therefrom of a synthesis gas having an $H_2/CO$ ratio of about 1:1 and upwardly.

Obviously, many modifications and variations of the invention as above set forth may be made without departing from the spirit and scope thereof, and only such limitations should be imposed as are indicated in the appended claims.

I claim:

1. In the conversion of a carbonaceous feed material containing hydrogen into synthesis gas comprising essentially hydrogen and carbon monoxide, the steps which comprise subjecting a metal capable of being readily carbided and subsequently decarbided, and oxidizable by steam to an oxide which is readily reducible by carbon monoxide, to reaction with said carbonaceous feed material at an elevated temperature at which said metal is thereby carbided, yielding a stream of gaseous hydrogen, subjecting an additional quantity of said metal to contact with water vapor at a high temperature at which the metal is converted to an oxide yielding additional free hydrogen, introducing said metal oxide and metal carbide into a reaction zone in the presence of a substantial stream of carbon dioxide at an elevated temperature at which interaction takes place with the formation of elemental metal and the liberation of a product stream of carbon monoxide and recovering product carbon monoxide thus formed.

2. In the conversion of a carbonaceous feed material containing hydrogen into hydrogen and carbon monoxide, wherein a metal capable of being readily carbided and subsequently decarbided is reacted with said carbonaceous feed material at an elevated temperature to form a carbide of said metal and yield gaseous hydrogen, the improvement which comprises decarbiding said metal carbide by contact with carbon dioxide in the presence of a readily reducible metal oxide at an elevated temperature in the range at which the reactants interact to yield substantially decarbided and deoxidized metal with the formation of a stream of carbon monoxide.

3. The method according to claim 2 wherein the metal reacted with said carbonaceous feed material comprises metal previously decarbided as aforesaid.

4. In the generation of synthesis gas comprising essentially hydrogen and carbon monoxide from a carbonaceous material containing a substantial proportion of hydrogen, subjecting a metal capable of being readily carbided and subsequently decarbided and capable of oxidizing to to a product which is reducible by carbon monoxide, to a cyclic series of steps comprising converting a portion of said metal to the form of an oxide, subjecting the second portion of said metal to reaction with said carbonaceous material at an elevated temperature at which the metal is thereby carbided, yielding a stream of gaseous hydrogen, and subjecting the resulting metal oxide and metal carbide, in admixture, to contact with a stream of carbon dioxide, at an elevated temperature at which decarbiding of the metal carbide and deoxidation of the metal oxide occur with the liberation of a product stream of carbon monoxide, and recovering product carbon monoxide thus formed.

5. The method according to claim 4 wherein the said metal remains in finely divided solid particle form.

6. The method according to claim 4 wherein the formation of said metal oxide is effected by treatment with steam.

7. The method according to claim 4 wherein the metal is in the form of finely divided solid particles which are continuously circulated through said series of steps.

CLAUDE W. WATSON.

References Cited in the file of this patent

UNITED STATES PATENTS

| Number | Name | Date |
|---|---|---|
| 1,992,909 | Davis | Feb. 26, 1935 |
| 2,264,427 | Asbury | Dec. 2, 1941 |
| 2,270,897 | Roberts, Jr., et al. | Jan. 27, 1942 |
| 2,436,938 | Scharmann et al. | Mar. 2, 1948 |
| 2,464,532 | Sellers | Mar. 15, 1949 |
| 2,485,875 | Gorin et al. | Oct. 25, 1949 |
| 2,523,284 | Eastman | Sept. 26, 1950 |
| 2,535,042 | Cohn et al. | Dec. 26, 1950 |

FOREIGN PATENTS

| Number | Country | Date |
|---|---|---|
| 51,572 | Germany | Mar. 17, 1890 |